US012672642B2

(12) United States Patent
Baek et al.

(10) Patent No.: US 12,672,642 B2
(45) Date of Patent: Jul. 7, 2026

(54) POULTRY WEIGHT MEASUREMENT AND WEIGHT ESTIMATION SYSTEM

(71) Applicant: UNIAI CORP., Daejeon (KR)

(72) Inventors: Seung Hwan Baek, Gwangmyeong-si (KR); Yong Joon Cho, Nonsan-si (KR); Jong Sik Kim, Daejeon (KR)

(73) Assignee: UNIAI CORP., Daejeon (KR)

( * ) Notice: Subject to any disclaimer, the term of this patent is extended or adjusted under 35 U.S.C. 154(b) by 697 days.

(21) Appl. No.: 18/018,813

(22) PCT Filed: Nov. 27, 2020

(86) PCT No.: PCT/KR2020/017107
§ 371 (c)(1),
(2) Date: Jan. 30, 2023

(87) PCT Pub. No.: WO2022/025354
PCT Pub. Date: Feb. 3, 2022

(65) Prior Publication Data
US 2023/0301279 A1      Sep. 28, 2023

(30) Foreign Application Priority Data

Jul. 30, 2020     (KR) ........................ 10-2020-0094867
Nov. 25, 2020     (KR) ........................ 10-2020-0160508

(51) Int. Cl.
*A01K 45/00*           (2006.01)
*G01G 3/14*            (2006.01)
*G06T 7/60*            (2017.01)
(52) U.S. Cl.
CPC .............. *A01K 45/00* (2013.01); *G01G 3/14* (2013.01); *G06T 7/60* (2013.01)
(58) Field of Classification Search
CPC ............ A01K 45/00; G01G 3/14; G01G 3/12; G01G 17/08; G06T 7/60
See application file for complete search history.

(56) References Cited

U.S. PATENT DOCUMENTS

2013/0108120 A1      5/2013  Van De Loo
2019/0307106 A1*    10/2019  Hartung ................. A01K 29/00
(Continued)

FOREIGN PATENT DOCUMENTS

KR          20130065896 A      6/2013
KR          20170058521 A      5/2017
(Continued)

*Primary Examiner* — Thomas M Hammond, III
(74) *Attorney, Agent, or Firm* — Maschoff Brennan

(57) ABSTRACT

The objective of the present invention is to provide a poultry weight measurement and weight estimation system, which can estimate weight by considering the unique size of each poultry individual and does not interrupt the transit of poultry. To accomplish the objective, the poultry weight measurement and weight estimation system according to the present invention can comprise: a rotary part which is connected to a motor and rotates and which has a wire wound thereon or unwound therefrom; a measurement unit which is connected to the wire and on which poultry can be placed; a scale unit for measuring the weight of poultry placed on the measurement unit; a camera unit for capturing an image of the top of the measurement unit; and a control unit which controls the motor so that the wire is wound on or unwound from the rotary part, and thus adjusts ascending and descending of the measurement unit, which receives information about the weight measured by the scale unit and information about the image captured by the camera to calculate the per-pixel weight of the poultry on the inner side of the measurement unit, and which estimates the per-pixel weight of the poultry on the outer side of the measurement unit on the basis of the calculation result.

11 Claims, 12 Drawing Sheets

(56) References Cited

U.S. PATENT DOCUMENTS

2021/0153479 A1*    5/2021    Mindel .................. G06V 10/26
2022/0394956 A1*    12/2022    Nagatomo .............. G01G 9/00
2023/0054534 A1*    2/2023    Lehr ...................... A01K 29/00

FOREIGN PATENT DOCUMENTS

KR          10-2009677  B1      8/2019
KR         20190103510  A       9/2019
KR          102128680   B1      7/2020

* cited by examiner

POULTRY WEIGHT MEASUREMENT AND WEIGHT ESTIMATION SYSTEM

FIELD OF INVENTION

The present invention relates to a weighing system, and more particularly, to a poultry weight measurement and weight estimation system that can measure the weight of several poultry and estimate a weight of poultry other than the measurement target using the measured weight values.

BACKGROUND OF INVENTION

In general, mass raising facilities for poultry are operated for mass production by raising hundreds or more of poultry at once. Among them, measuring the weight of chickens is very important in poultry farms. If the chickens fall below or exceed the standard weight, an egg production rate is lowered and productivity is reduced. Therefore, it is very important to manage the weight of poultry during breeder breeding. Further, domestically, chickens are graded based on the weight of dressed poultry and, depending on the grades of chickens divided in this way, the use of chickens becomes varied. Therefore, in order to ship chickens with desired grades and to predict a shipping date of chickens, it requires constant weighing of chickens.

On the other hand, there is a problem that it is inefficient to directly measure the weight of chickens by manual labor or to measure the weight of each of hundreds of chickens.

Therefore, in order to solve this problem, a conventional technique for automatically measuring the weight of poultry and calculating the average weight per individual of measurement targets has been developed, and the examples are as follows.

Referring to FIG. 1, the conventional poultry weighing system includes: a measurement device that consists of an upper plate for measuring the weight of each measurement target, a lower part provided with a display module for displaying the measured weight, a camera unit for photographing an image of the lower part, and a transmission unit for transmitting the image; and a server provided with a pattern recognition unit that analyzes an image extracted from the images transmitted from the measurement device and then calculates an average weight value per individual of the measurement target, wherein the server includes: a transceiver unit for receiving transmission of the images from the measurement device; an image management unit for extracting an image from the transmitted images and for storing the same; and a monitoring unit for storing the calculated average weight value wherein the transceiver unit transmits the average weight value stored in the monitoring unit to a user's terminal.

However, when measuring the weight of poultry by the conventional working method, it is only possible to measure the average weight of the poultry, but it is difficult to measure the weight in consideration of the unique size of each poultry entity. Further, there were problems that the measurement system obstructs the passage of poultry other than the weight measurement target, hence causing stress to the chickens and eventually increasing the mortality rate of the chickens while reducing the growth rate thereof.

PRIOR ART LITERATURE

Patent Document

Korean Registered Patent Publication No. 10-2009677 (Registration Date: Aug. 6, 2019)

SUMMARY OF INVENTION

Technical Problem to be Solved

The present invention has been devised to solve the aforementioned problems, and an object of the present invention is to provide a poultry weight measurement and weight estimation system that can estimate the weight in consideration of the unique size of each poultry individual, while not interfering with the passage of poultry.

Technical Solution

The poultry weight measurement and weight estimation system according to the present invention may be characterized in that it includes: a rotary unit which rotates while being connected to a motor, and has a wire wound thereon or unwound therefrom; a measurement unit which is connected to the wire and on which poultry can be placed; a scale unit for measuring the weight of poultry placed on the measurement unit; a camera unit for taking an image of the top of the measurement unit; and a control unit which controls the motor so that the wire is wound on or unwound from the rotary unit, and thus adjusts ascending and descending (or lifting and lowering) of the measurement unit, which receives information on the weight measured by the scale unit and information on the image taken by the camera unit to calculate a weight per pixel ("per-pixel weight") of the poultry inside the measurement unit, and which estimates a per-pixel weight of the poultry outside the measurement unit on the basis of the above calculated value.

Furthermore, the poultry weight measurement and weight estimation system according to the present invention may further include a pair of connectors, of which one end of each connector is connected to the rotary unit while the other end thereof is connected to one side and the other side of the measurement unit.

At this time, the pair of connectors may have a length-adjustable configuration and thus may consist of multi-stage rods, slide poles or link connection members.

Further, the pair of connectors may further include fixtures to connect the pair of connectors to each other, while the camera unit may be connected to the fixtures.

In this case, the pair of connectors may each include an upper connecting stage positioned on an upper portion and a lower connecting stage positioned on a lower portion, which is directly or indirectly connected to the upper connecting stage, and to which the measurement unit is connected.

More preferably, the scale unit may be provided between a pair of upper connecting stages and a pair of lower connecting stages, respectively, and may measure the weight applied to the measurement unit.

Further, the fixture may include a first fixing stage formed at a lower end of the upper connecting stage and a second fixing stage formed at an upper end of the lower connecting stage.

At this time, the camera unit may be provided on the second fixing stage, while the scale unit may be provided between the first fixing stage and the second fixing stage, so as to measure the weight applied to the measurement unit connected to the lower connecting stage.

Furthermore, it may further include a distance sensor for measuring a distance between the measurement unit and the ground.

Further, the control unit may calculate a per-pixel weight of the poultry inside the measurement unit on the basis of a distance between the camera unit and the pre-designated measurement unit, calculate a per-pixel weight of the poultry outside the measurement unit on the basis of a distance between the camera unit and the ground, and thus, estimate the weight per individual of the poultry outside the measurement unit.

Furthermore, it may further include a triangular panel unit, in which an upper edge is fixed to the lower portion of the measurement unit over the entire length direction of the measurement unit and which has a predetermined height.

In this case, the control unit may designate a region formed by the periphery of the triangular panel as an inside of the measurement unit and designate the outside of the above region formed by the periphery of the triangular panel as an outside of the measurement unit, so as to distinguish the above inside and outside of the measurement unit from each other.

Moreover, it may be characterized by further including an external camera for photographing an area not overlapping the area taken by the camera unit.

Effects of Invention

With the above described configuration, the poultry weight measurement and weight estimation system according to the present invention may measure the weight per individual by checking the number of poultry with the camera unit when several poultry are placed on the measurement unit, may estimate the weight of poultry that does not climb on the measurement unit, and may measure the weight while the measurement unit is positioned at a certain height from the ground, whereby it does not restrict the movement of the poultry, and is height-adjustable to thus be possibly and efficiently installed regardless of the size of the poultry.

4

Figure 13:
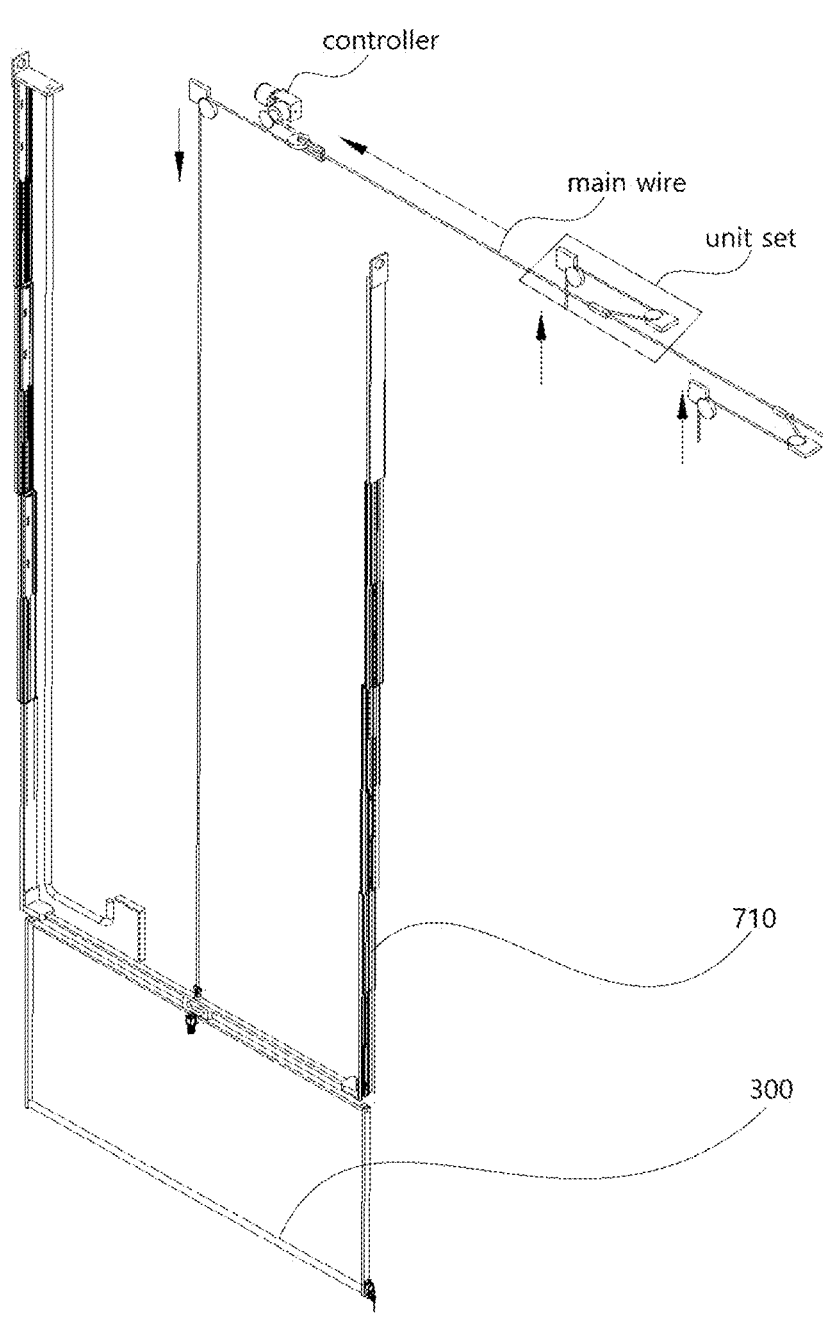

FIG. 13 is a perspective view illustrating a sixth embodiment of the present invention.

Figure 14:
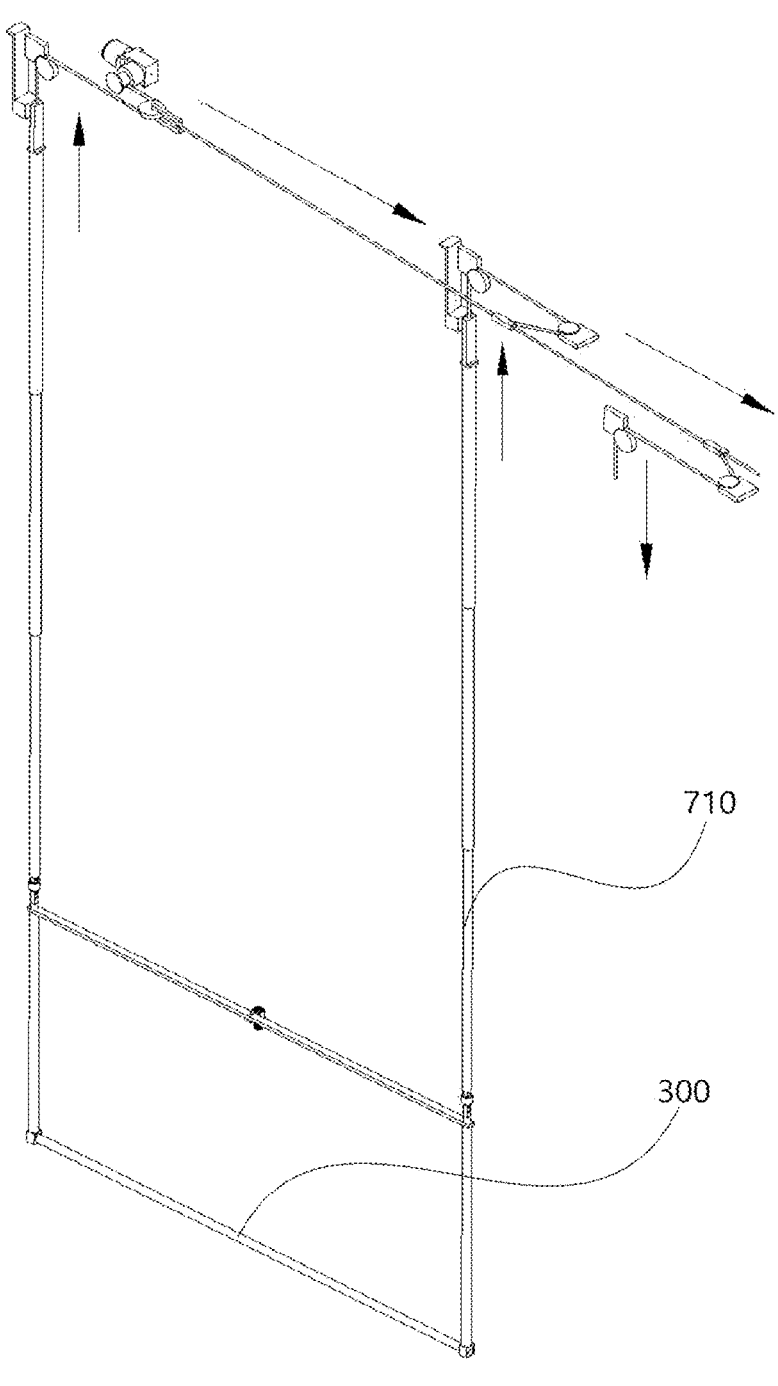

FIG. 14 is a perspective view illustrating a seventh embodiment of the present invention.

DETAILED DESCRIPTION OF PREFERRED EMBODIMENTS OF INVENTION

Hereinafter, the technical idea of the present invention will be described in more detail with reference to the accompanying drawings. Prior to this, the terms or words used in the present specification and claims should not be construed as being limited to conventional or dictionary meanings, but should be interpreted as the meaning and concept consistent with the technical idea of the present invention based on the principle that the inventor can properly define the concept of the term in order to describe his (her) invention in in best mode.

Accordingly, the embodiments described in this specification and the configurations shown in the drawings are only the most preferred embodiment of the present invention and do not represent all the technical spirit of the present invention, therefore, it should be understood that various modification capable of replacing the above embodiments are possible at the filing time of the present application.

Hereinafter, the technical idea of the present invention will be described in more detail with reference to the accompanying drawings. Since the accompanying drawings are merely illustrative examples to concretely explain the technical idea of the present invention, the technical idea of the present invention is not limited to the forms in the accompanying drawings.

Figure 1:
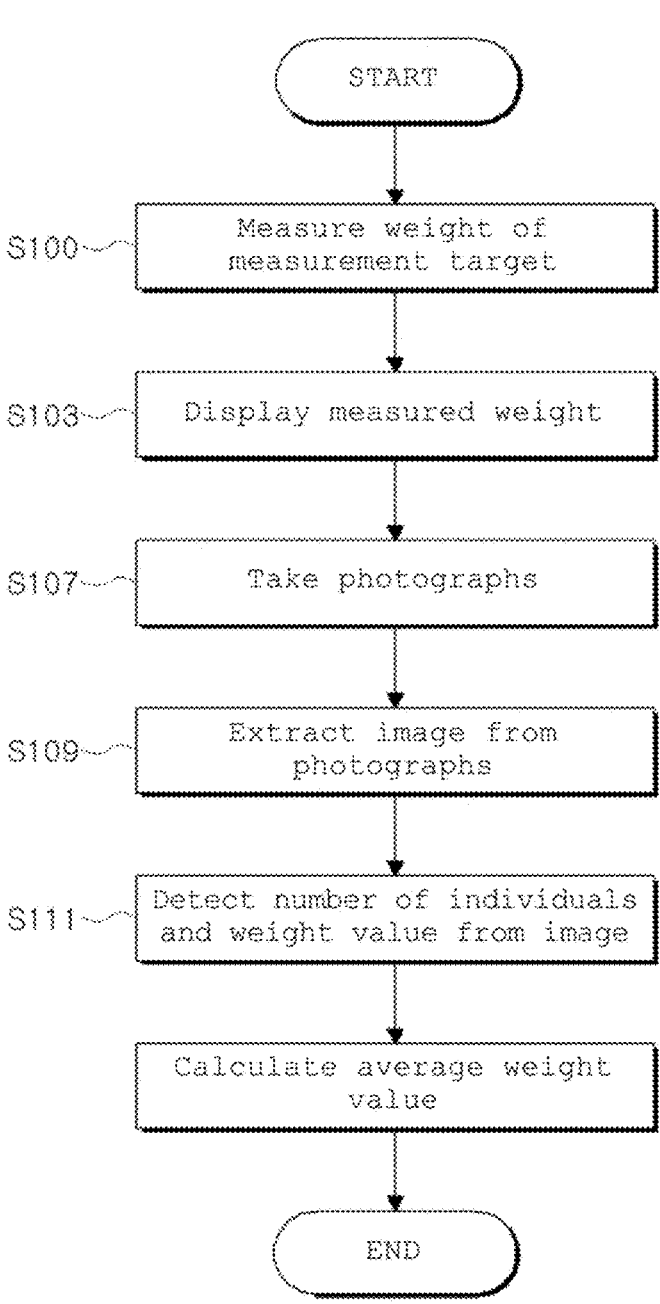
FIG. 1 is a flow chart of a poultry weighing method based on a conventional pattern recognition technique.
Figure 2:
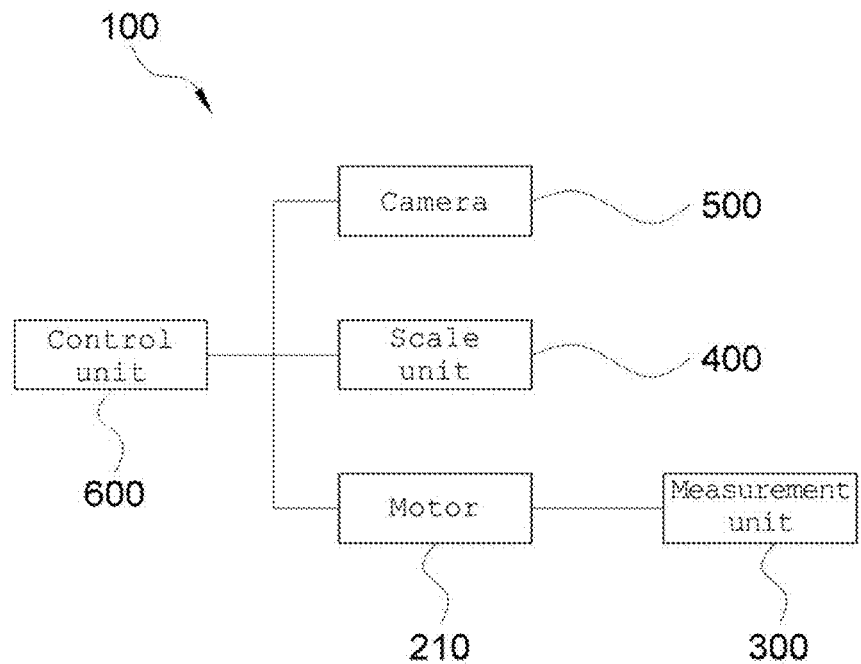
FIG. 2 is a schematic block diagram of the poultry weight measurement and weight estimation system according to the present invention.
Figure 3:
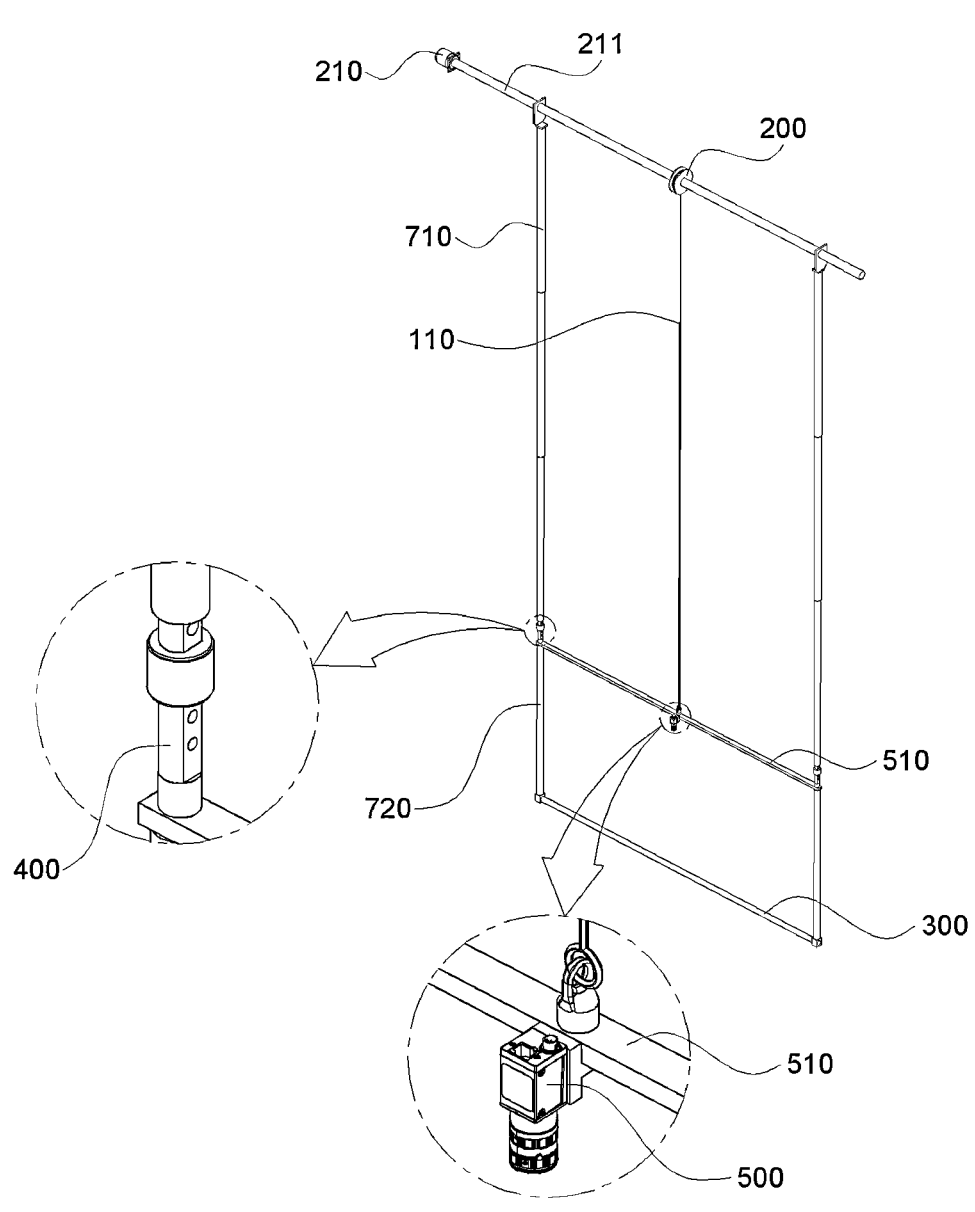
FIG. 3 is a perspective view illustrating a first embodiment of the present invention.

Referring to FIGS. 2 and 3, the poultry weight measurement and weight estimation system 100 according to the present invention may include: a rotary unit 200 which rotates while being connected to a motor 210, and has a wire 110 wound thereon or unwound therefrom; a measurement unit 300 which is connected to the wire 110 and on which poultry can be placed; a scale unit 400 for measuring the weight of poultry placed on the measurement unit 300; a camera unit 500 for taking an image of the top of the measurement unit 300; and a control unit 600 which controls the motor 210 so that the wire 110 is wound on or unwound from the rotary unit 200, and thus adjusts ascending and descending (or lifting and lowering) of the measurement unit 300, which receives information on the weight measured by the scale unit 400 and information on the image taken by the camera unit 500 to calculate a per-pixel weight of the poultry inside the measurement unit 300, and which estimates a per-pixel weight of the poultry outside the measurement unit 300 on the basis of the above calculated value.

The rotary unit 200 is configured to be directly or indirectly connected to the motor 210, and the motor 210 may be controlled by the control unit 600 to rotate or stop the rotary unit 200 in one direction or the other direction.

The rotary unit 200 may include a plurality of pulleys which transfer the wire 110 by the rotation of the motor 210, wherein the wire 110 may be wound around a main pulley provided at a position close to the motor 210 so as to raise the measurement unit 300. Further, the rotary unit 200 may consist of a single pulley that is centrally connected to a rotational shaft 211 formed in the motor 210 and thus rotates along with the motor 210 simultaneously, so that one end of the wire 110 is fixed to the single pulley and is wound on or unwound from the same so as to ascend or descend the measurement unit 300.

The measurement unit 300 has a configuration in that the poultry can get (or climb) on. Further, the measurement unit 300 may ascend when the wire 110 is wound around the rotary unit 200, while descending when the wire 110 is unwound from the rotary unit 200. The measurement unit 300 may have an ascending height assigned according to the size of the poultry in a kennel. That is, in order to prevent a passage of poultry due to a position of the measurement unit 300 to be provided, the ascending height may be adjusted such that a height when installed in a poultry farm where adult chickens are bred is higher than a height when installed in another poultry farm where chicks are bred.

At this time, the measurement unit 300 may be characterized in that it consists of a perch. Poultry generally has a habit of climbing on a perch for resting and sleeping except for feeding or bathing. Therefore, when the measurement unit 300 is made f a perch, it may induce the poultry to get on, and may attain effects of reducing a weight of the entire structure forming the system.

The scale unit 400 is configured to measure the weight of the poultry mounted on the measurement unit 300, and may determine the weight of the poultry using tension applied to the wire 110 or by measuring a weight added to the measurement unit 300.

The camera unit 500 is configured to photograph an upper image of the measurement unit 300, and may photograph the poultry mounted on the measurement unit 300 and transmit image information thereof to the control unit 600. In this case, the camera unit 500 may take images as a combination of pixels, and an RGBD camera capable of measuring a distance between the camera and a measurement target or a surface on which the measurement target is located may be applied.

The control unit 600 is configured to be electrically connected to the motor 210, the scale unit 400 and the camera unit 500 to control each component, and may comprise: a communication unit that enables data communication with the motor 210, the scale unit 400 and the camera unit 500; a database in which weight information in the scale unit 400, image information in the camera unit 500, an algorithm for weight calculation or estimation and a learning algorithm are stored; a learning unit in which an estimation algorithm that calculates an algorithm for weight estimation based on the weight information of the scale unit 400 and the image information of the camera unit 500 is created by the learning algorithm stored in the database; and a calculation unit that receives the weight information of the scale unit 400 and the image information of the camera unit 500, and calculates the weight per pixel ("per-pixel weight") of the poultry inside the measurement unit 300 by the pre-stored weight calculation algorithm. The control unit 600 may control rotation of the motor 210, or may receive the weight information measured by the scale unit 400 and the image information of the camera unit 500, calculate the per-pixel weight of the poultry inside the measurement unit 300 based on the above information, and then, store the calculated result in the database. Further, the control unit may estimate the per-pixel weight of the poultry outside the measurement unit 300 according to the pre-stored algorithm on the basis of the calculated per-pixel weight value of the poultry inside the measurement unit 300.

Through the above configuration, the poultry weight measurement and weight estimation system 100 according to the present invention may check the number of animals with the camera unit 500 when several poultry are mounted on the measurement unit 300 to thus measure the weight per individual, and may estimate the weight of the poultry that does not climb on the measurement unit 300. Specifically, the measurement unit 300 may measure the weight in a state having a predetermined height from the ground so that it is possible to adjust the height while not restricting movement of the poultry, therefore, it can be installed regardless of the size of the poultry.

Figure 4:
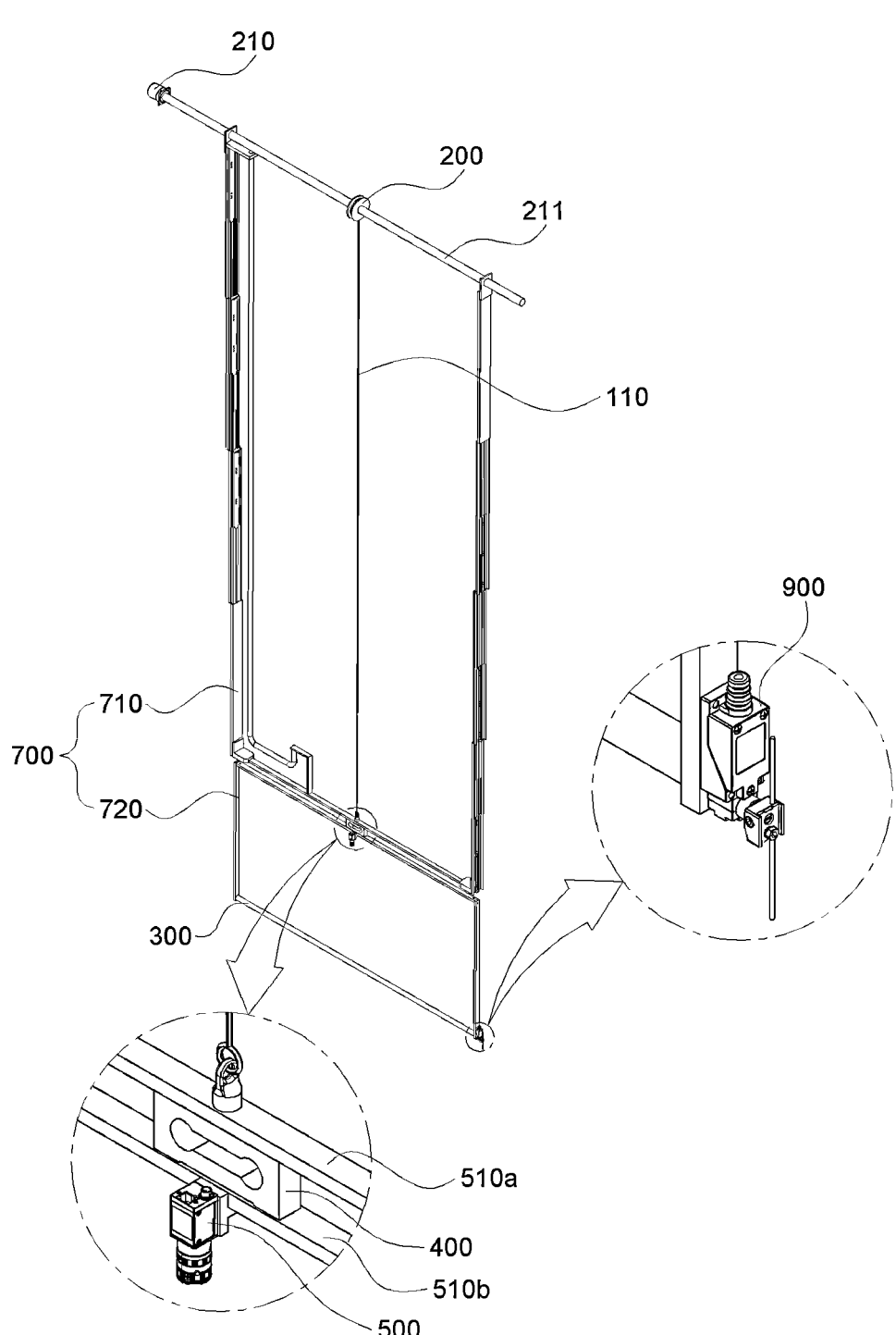
FIG. 4 is a perspective view illustrating a second embodiment of the present invention.
Figure 5:
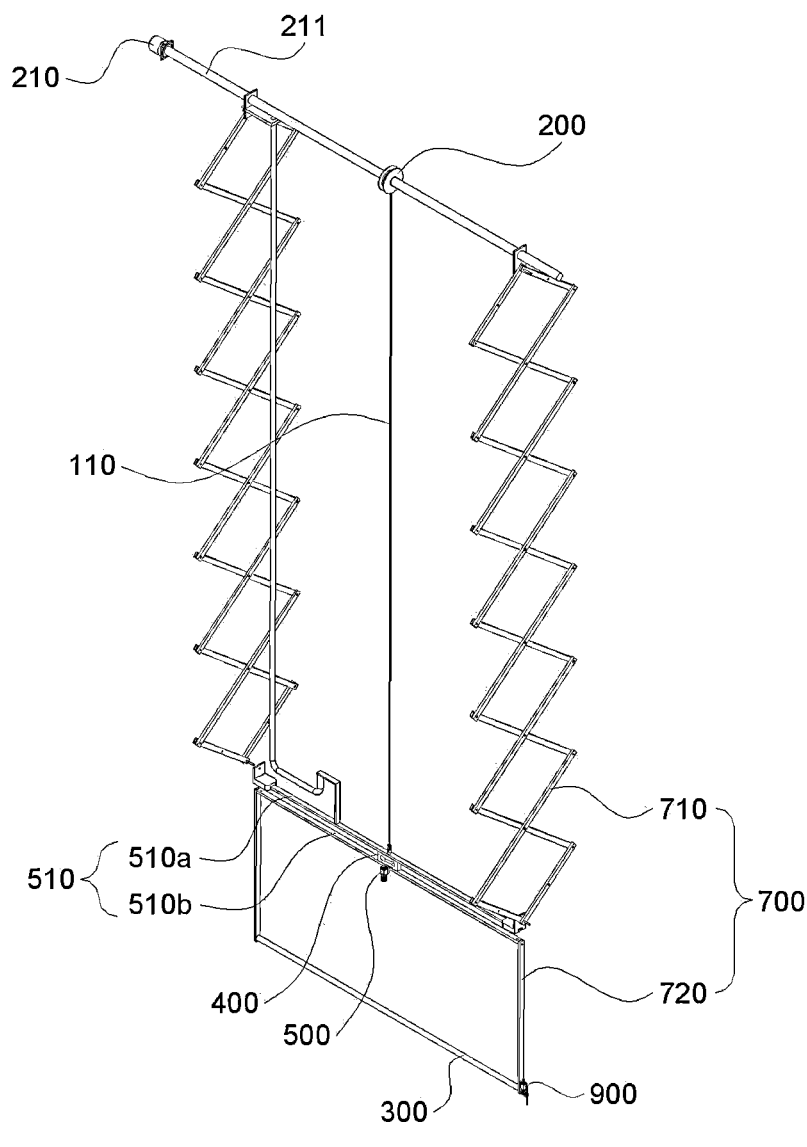
FIG. 5 is a perspective view illustrating a third embodiment of the present invention.

Referring to FIGS. 3 to 5, the poultry weight measurement and weight estimation system 100 according to the present invention may be characterized by further comprising a pair of connectors 700, wherein one end of each connector is connected to the rotary unit 200 while the other end of thereof is one side and the other side of the measurement unit 300.

The pair of connectors 700 are configured to limit and prevent shaking or vibration of the wire 110 and the measurement unit 300, therefore, may attain different effects in that it can prevent the wire 110 from shaking due to movement of the poultry climbing on the measurement unit 300 or external environment, which in turn may prevent measurement reliability of the scale unit from being reduced, and it can prevent the departure of poultry due to the shaking.

In this case, the pair of connectors 700 are configured to be length-adjustable, and may consist of multi-stage rods, slidable poles or link connection members.

When the connectors 700 are cross-inserted or formed in an overlapping structure, the limit of an ascendable height of the measurement unit 300 may be increased and therefore the passage of poultry passing below the measurement unit 300 can become completely free regardless of the size of the poultry.

At this time, the pair of connectors 700 may be connected to the rotational shaft 211 formed in the motor 210 while interposing a bearing therebetween so as to be free from rotation of the rotational shaft 211. Alternatively, the above connectors may be connected to a fixed shaft capable of securing a top position of the pair of connectors 700.

When the pair of connectors 700 are provided, the camera unit 500 may be connected to a fixture 510 that connects the pair of connectors 700 to each other.

If the camera unit 500 is installed on the fixture 510 connecting the pair of connectors 700, the configuration may be integrated and a space required for installing the inventive system may be reduced. Further, it is possible to prevent a the camera unit 500 from changing a photographing angle or from being damaged due to surrounding poultry or external environment.

Further, each of the pair of connectors 700 may include an upper connecting stage 710 and a lower connecting stage 720. The upper connecting stage 710 and the lower connecting stage 720 may be directly or indirectly connected to each other.

In this case, the scale unit 400 is provided between a pair of the upper connecting stages 710 and a pair of the lower connecting stages 720 in order to connect the upper connecting stage 710 and the lower connecting stage 720 so that a weight applied to the measurement unit 300 connected to the lower connecting stage 720 can be measured.

Referring to FIG. 4, the fixture 510 may include a first fixing stage 510*a* formed at a lower end of the upper connecting stage 710, and a second fixing stage 510*b* formed at an upper end of the lower connecting stage 720. Further, the camera unit 500 may be provided at the second fixing stage 510*b*, while the scale unit 400 may be arranged between the first fixing stage 510*a* and the second fixing stage 510*b* in order to connect the first fixing stage 510*a* and the second fixing stage 510*b* to each other, whereby it is possible to measure the weight applied to the measurement unit 300 connected to the lower connecting stage 720.

The poultry weight measurement and weight estimation system 100 according to the present invention may be characterized by further comprising: a distance sensor 900 for measuring a distance between the measurement unit 300 and the ground.

The distance between the camera unit 500 and the measurement unit 300 is fixed and stored in the control unit 600. For the camera unit 500 formed of a general camera, if estimating the weight of the poultry outside the measurement unit 300 by presuming an ascending height of the measurement unit 300 based on rotation of the motor 210, estimation reliability may be deteriorated. For this reason, the control unit 600 receives distance information from the distance sensor 900 capable of measuring an actual distance and applies the same to the image information received from to camera unit 500, therefore, may calculate a per-pixel weight of the poultry inside the measurement unit 300 and estimate a per-pixel weight and a weight per individual outside the measurement unit 300.

The control unit 600 may calculate the per-pixel weight of the poultry inside the measurement unit 300 based on a distance between the camera unit 500 and the pre-designated measurement unit 300, and calculate the per-pixel weight of the poultry outside the measurement unit 300 based on a distance between the camera unit 500 and the ground, thereby estimating the weight per individual.

Figure 6:
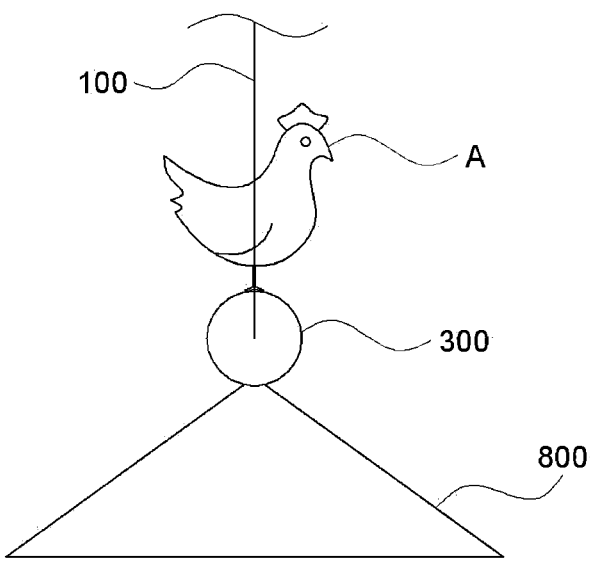
FIG. 6 is an enlarged side view illustrating a fourth embodiment of the present invention.

Referring to FIG. 6, the poultry weight measurement and weight estimation system 100 according to the present invention may be characterized by further comprising a triangular panel unit 800, of which an upper edge is fixed to a lower portion of the measurement unit 300 over the entire length direction of the measurement unit 300, and which has a predetermined height.

The triangular panel unit 800 may prevent poultry which is not a target for weight measurement, from passing below the measurement unit 300 in a state where the measurement unit 300 is raised to measure the weight, thereby improving weight measurement reliability for the poultry inside the measurement unit 300. Further, since the triangular panel unit 800 has a bottom surface parallel to the ground and is formed in a triangular shape to be inclined toward an upper side, which in turn is helpful for the poultry climbing from the ground to the measurement unit 300.

Figure 7:
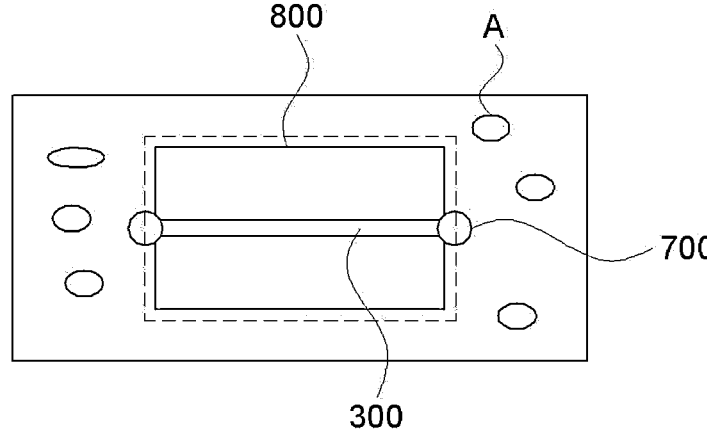
FIG. 7 is a plan view illustrating the fourth embodiment of the present invention.

Referring to FIG. 7, the control unit 600 may be characterized in that it designates a region formed by the periphery (or circumference) of the triangular panel unit 800 in the image information as an inside of the measurement unit 300 while defining the outside of the above region formed by the periphery of the triangular panel unit 800 as an outside of the measurement unit 300, thereby distinguishing the inside and outside of the measurement unit 300 from each other.

In other words, the control unit 600 may recognize the region formed by the periphery of the triangular panel unit 800 in the image information transmitted from the camera unit 500 as the inside of the measurement unit 300 and thus calculate a per-pixel weight of the poultry inside the measurement unit 300.

At this time, the triangular panel unit 800 is preferably formed with a color distinguishable from the poultry and the ground in order to more clearly distinguish an inner circumference of the triangular panel unit 800 and an outer circumference of the triangular panel unit 800 from each other.

Figure 8:
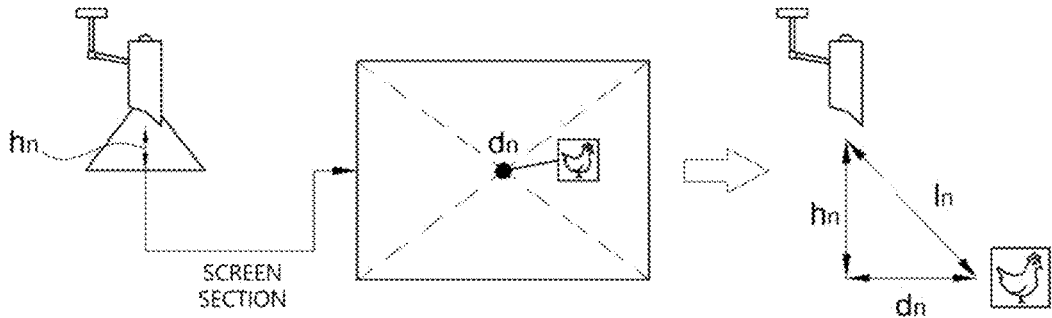
FIG. 8 is a first schematic diagram illustrating the operation of a control unit according to the present invention.
Figure 9:
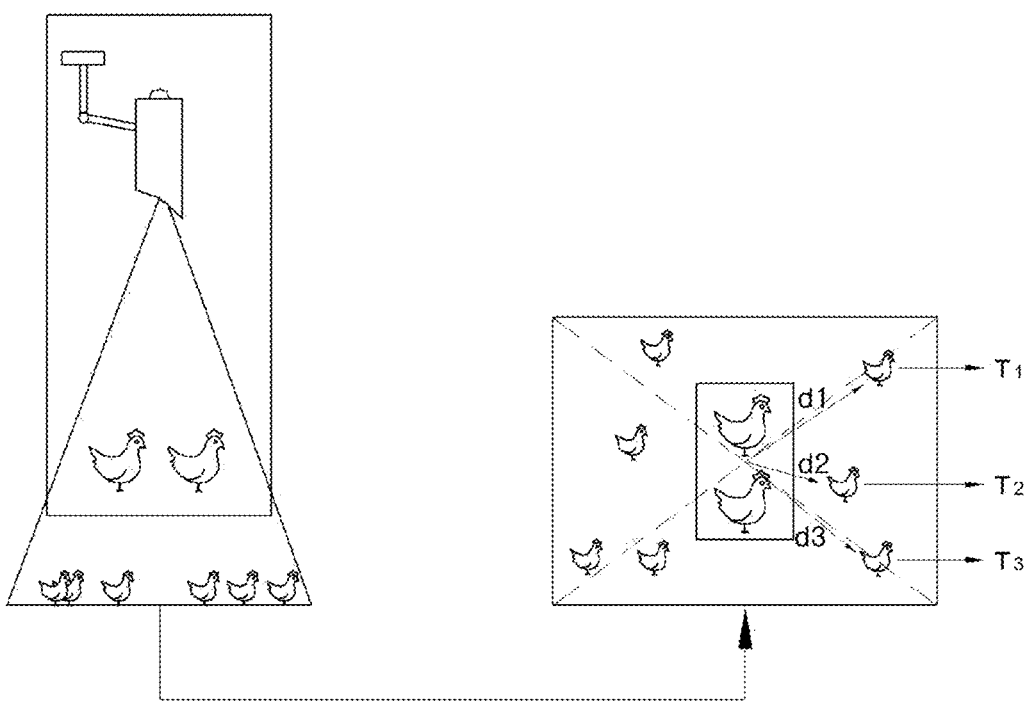
FIG. 9 is a second schematic diagram illustrating the operation of a control unit according to the present invention.
Figure 10:
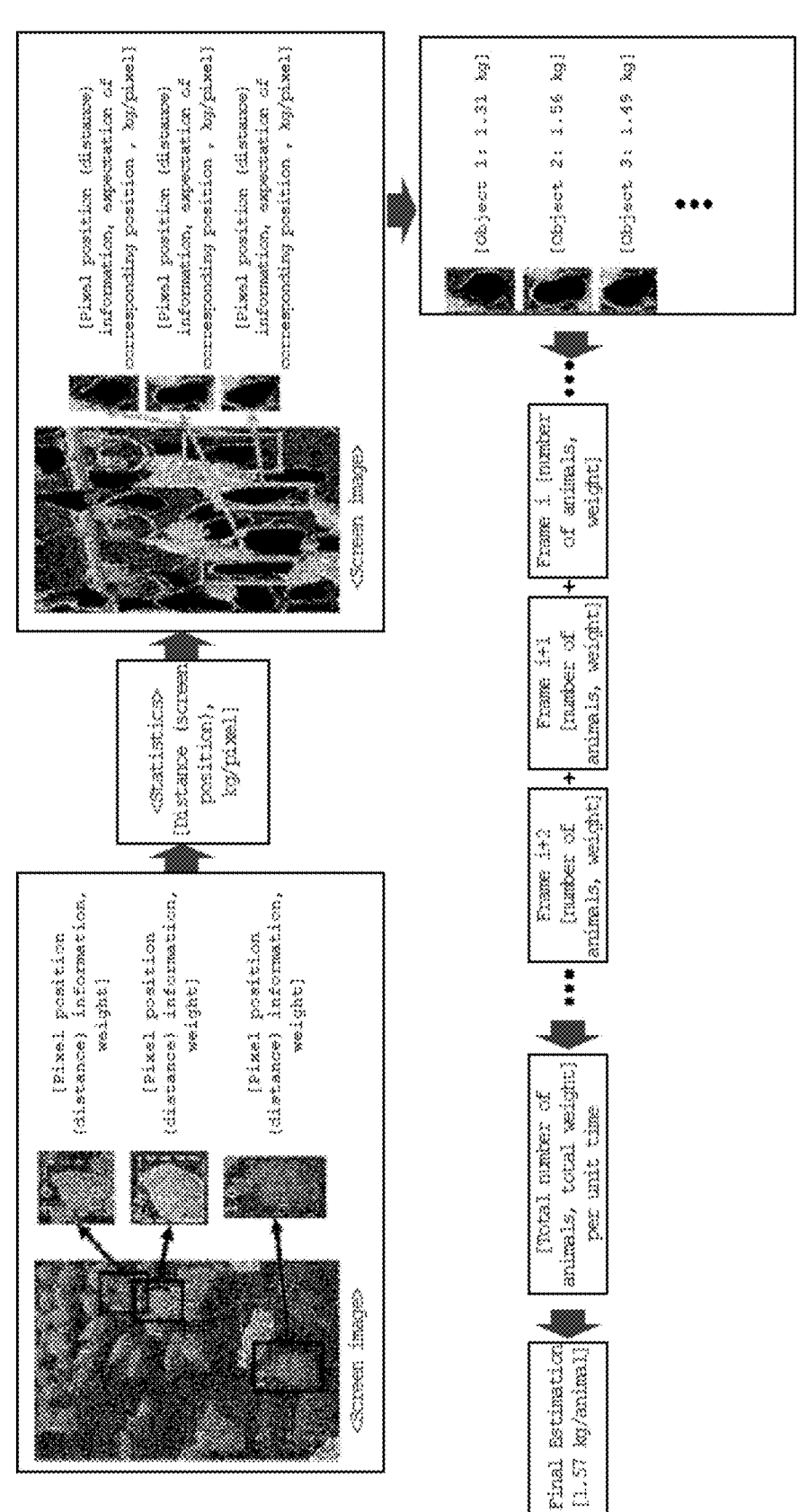
FIG. 10 is a third schematic diagram illustrating the operation of a control unit according to the present invention.

Referring to FIGS. 8 to 10, the control unit 600 may determine not only a vertical distance (hn) corresponding to a distance between the measurement unit 300 or the ground, on which the poultry is standing, and the camera unit 500, but also a horizontal distance (dn) between the camera unit 500 and the above poultry through the image information transmitted from the camera unit 500, so that a liner distance (ln) to a measurement target can be calculated through trigonometry to thus estimate the weight of individual outside the measurement unit 300.

The control unit 600 may receive the image information from the camera unit 500 for a predetermined period of time, wherein the image information may be a form of photos or images. The control unit 600 may estimate the weight per individual of all the poultry contained in the image information for a predetermined period of time and, by displaying the estimated weight and applying the same to the image information, the result may be printed out on an external screen (or display) unit connected to the control unit 600.

Using the distance value according to FIG. 9, the control unit 600 may apply the correction of the per-pixel weight of the poultry by distance shown in Table 1 below.

TABLE 1

| Target | Distance to target | Correction value | Estimated weights |
|--------|--------------------|------------------|-------------------|
| $T_1$ | $d_1$ | $\lambda_1$ | $(\text{kg/pixel})_1 * (T_1 \text{pixel numbers})$ |
| $T_2$ | $d_2$ | $\lambda_2$ | $(\text{kg/pixel})_2 * (T_2 \text{pixel numbers})$ |
| $T_3$ | $d_3$ | $\lambda_3$ | $(\text{kg/pixel})_3 * (T_3 \text{pixel numbers})$ |

FIG. 10 illustrates a weight estimation step according to an embodiment. The control unit may execute data structuring of the weight information of poultry corresponding to pixel positions of the poultry on image taken by the camera unit, that is, kg/pixel, through statistics, bring the corresponding kg/pixel information from data through the pixel position of the poultry recognized by the camera unit when tested or actually applied, and then, derive an estimated weight value for each individual recognized through the entire pixel size of the corresponding poultry images.

The above process is for one frame, and may proceed for all frames of the streamed video image.

Further, the number and weight of animals estimated in each frame may be combined for a predetermined unit time such as 12 hours or 24 hours, and the total estimated weight within the unit time may be calculated through averaging. At this time, a method for defining the unit time is not particularly limited but may be directly influenced by an information collection progress of the entities inside the scale area. As an example of designating or altering the unit time, if the number of poultry individuals climbed on the measurement unit is small, it is desirable to secure the number of individuals by extending a measurement period.

If weight estimation accuracy for the poultry individuals located in the measurement unit is secured, the weight per individual outside the measurement unit is estimated through correction values ($\lambda_i$) of FIG. 9 wherein the correction values preferably include values calculated through many experiments. Further, the weights of individuals outside the measurement unit are possibly estimated from several hundred to tens of thousands according to the photographing range and photographing angle of the camera unit of the number of external cameras to be described with reference to FIG. 12.

Figure 11:
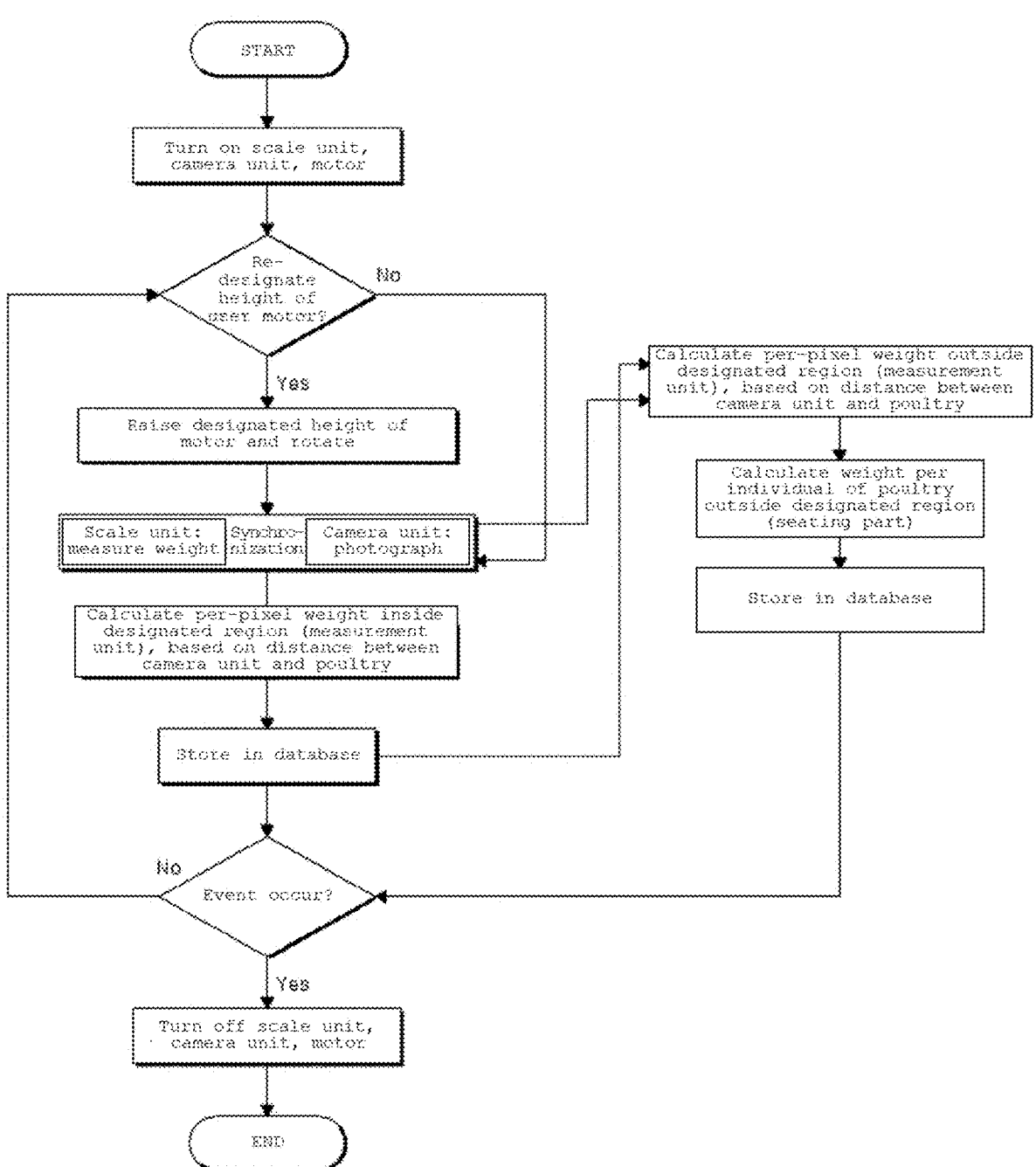
FIG. 11 is a flowchart of the operation of the poultry weight measurement and weight estimation system according to the present invention.

Referring to FIG. 11, the sequential order for operation of the poultry weight measurement and weight estimation system 100 according to the present invention will be explained as follows; when weight measurement and weight estimation starts, the control unit 600 may turn on a power for the scale unit 400, the camera unit 500 and the motor 210, and, if intended to alter a distance between the measurement unit 300 and the ground, may rotate the motor 210 to thus change a height of the measurement unit 300.

When the adjustment of the motor 210 is finished or there is no height adjustment, the scale unit 400 may transmit the weight information to the control unit 600 and the camera unit 500 may also transmit the image information to the control unit 600, wherein the weight information and the image information are preferably transmitted as real-time information continuously within a specified time.

The weight information and the image information may be stored in the database, and the control unit 600 may apply the weight information and the image information to an estimation algorithm in real time in order to determine a per-pixel weight and a weight per individual of the poultry outside the measurement unit 300 in real time.

Accordingly, a when the weight information and the image information are changed, the estimated calculated value of the estimation algorithm stored in the learning unit may be changed. Further, as the weight information and the image information are accumulated, reliability of the per-pixel weight and the weight per individual of poultry outside the measurement unit 300, which are estimated by the control unit 600, may be improved.

Since the per-pixel weight and the weight per individual of the poultry outside the measurement unit 300 estimated by the learning unit are also stored in real time in the database, the control unit 600 may display the weight per individual of the poultry inside the measurement unit 300, as well as the weight per individual of the poultry outside the measurement unit 300, on the image information, and then output the same to the external screen unit connected to the control unit 600.

Further, when a certain time elapses, calculated values of the per-pixel weight of the poultry inside the measurement unit 300 through weight information are accumulated, so that estimation reliability for the per-pixel weight value and the weight value per individual of the poultry outside the measurement unit 300 may be improved. In this case, even without the calculated value of the per-pixel weight of the poultry inside the measurement unit, using the above weight information ad the image information may enable calculation of the per-pixel weight and the weight per individual of the poultry outside the measurement unit 300.

Figure 12:
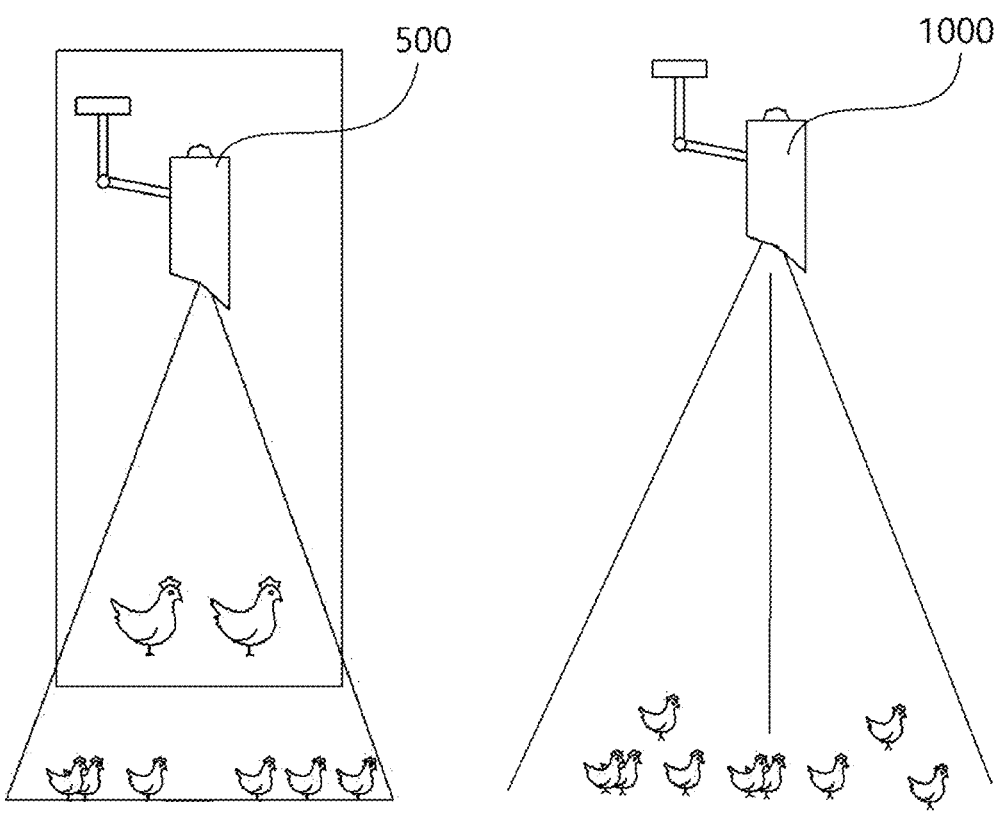
FIG. 12 is a schematic view illustrating a camera unit and an external camera according to a fifth embodiment of the present invention.

Referring to FIG. 12, the poultry weight measurement and weight estimation system according to the present invention may be characterized by further comprising an external camera 1000 that photographs an area not overlapping with the photographing area of the camera unit 500.

In other words, the external camera 1000 photographs a direction and an area that cannot be taken by the camera unit 500, therefore, may photograph a larger number of poultry not limited to a location of the camera unit 500. Accordingly, the control unit may calculates the per-pixel weight of the poultry inside the measurement unit and may estimate the per-pixel weight of the poultry photographed by the external camera 1000, based on the above calculated value, thereby increasing a measurement rage for weight estimation.

At this time, the external camera 1000 may be provided in plural according to a farming range of poultry, specifically, the external camera 1000 is preferably installed such that a height or position thereof is adjustable depending on a growth period or a farming environment of the poultry.

Referring to FIG. 13, an upper connecting part 710 of the connector is fixed at a top end thereof by a ceiling or an external structure, and the measurement unit 300 may ascend or descend by a pulley unit. At this time, as many unit sets as necessary can be connected to a main wire, and load concentration may be distributed by mounting the unit sets alternately on left and right sides around the main wire.

Referring to FIG. 14, the upper connection part 710 of the connector is connected to the wire, which in turn can raise or lower the measurement unit 300 through movement of the wire. In this case, as shown in FIG. 13, it is possible to connect as many unit sets as necessary to the main wire and to distribute the load concentration by alternately mounting the unit sets on the left and right sides around the main wire.

The present invention is not particularly limited to the above-described embodiments, and various modifications are possibly made without departing from the gist of the present invention as claimed in the appended claims.

DESCRIPTION OF REFERENCE NUMERALS

100: Poultry weight measurement and weight estimation system
110: Wire
200: Rotary unit
210: Motor
211: Rotational shaft
300: Measurement unit
400: Scale unit
500: Camera unit
510: Fixture
510*a*: First fixing stage
510*b*: Second fixing stage
600: Control unit
700: Connector
710: Upper connecting stage
720: Lower connecting stage
800: Triangular panel unit
900: Distance sensor
1000: External camera

The invention claimed is:
1. A poultry weight measurement and weight estimation system, characterized by comprising:
   a rotary unit which rotates while being connected to a motor, and has a wire wound thereon or unwound therefrom;
   a measurement unit which is connected to the wire and on which poultry can be placed;
   a scale unit for measuring the weight of poultry placed on the measurement unit;
   a camera unit for taking an image of the top of the measurement unit; and
   a control unit which controls the motor so that the wire is wound on or unwound from the rotary unit, and thus adjusts ascending and descending (or lifting and lowering) of the measurement unit, which receives information on the weight measured by the scale unit and information on the image taken by the camera unit to calculate a weight per pixel ("per-pixel weight") of the poultry inside the measurement unit, and which estimates a per-pixel weight of the poultry outside the measurement unit on the basis of the above calculated value,
   wherein the system is characterized in that it further comprises: a triangular panel unit, in which an upper edge is fixed to the lower portion of the measurement unit over the entire length direction of the measurement unit and which has a predetermined height, and wherein the control unit designates an area formed around the periphery of the triangular panel as an inside of the measurement unit and designates an outside of the above area formed around the periphery of the triangular panel as an outside of the measurement unit, so as to distinguish the above inside and outside of the measurement unit from each other.

2. The system according to claim 1, wherein the system is characterized in that it further comprises a pair of connectors, of which one end of each connector is connected to the rotary unit while the other end thereof is connected to one side and the other side of the measurement unit.

3. The system according to claim 2, wherein the pair of connectors have a length-adjustable configuration and consist of multi-stage rods, slidable poles or link connection members.

4. The system according to claim 2, wherein the pair of connectors further include fixtures to connect the pair of connectors to each other, and the camera unit is connected to the fixtures.

5. The system according to claim 4, wherein each of the pair of connectors includes:

an upper connecting stage positioned on an upper portion; and a lower connecting stage positioned on a lower portion, which is directly or indirectly connected to the upper connecting stage, and to which the measurement unit is connected.

6. The system according to claim 5, wherein the scale unit is provided between a pair of upper connecting stages and a pair of lower connecting stages, respectively, and measures the weight applied to the measurement unit.

7. The system according to claim 5, wherein the fixture includes:

a first fixing stage formed at a lower end of the upper connecting stage; and a second fixing stage formed at an upper end of the lower connecting stage.

8. The system according to claim 7, wherein the camera unit is provided on the second fixing stage, and the scale unit is provided between the first fixing stage and the second fixing stage, so as to measure the weight applied to the measurement unit connected to the lower connecting stage.

9. The system according to claim 1, wherein the system is characterized in that it further comprises: a distance sensor for measuring a distance between the measurement unit and the ground.

10. The system according to claim 9, wherein the control unit calculates a per-pixel weight of the poultry inside the measurement unit on the basis of a distance between the camera unit and the pre-designated measurement unit, and calculates a per-pixel weight of the poultry outside the measurement unit on the basis of a distance between the camera unit and the ground so as to, estimate the weight per individual of the poultry outside the measurement unit.

11. The system according to claim 1, wherein the system is characterized in that it further comprises: an external camera for photographing an area not overlapping the area taken by the camera unit.

* * * * *